Feb. 5, 1935. G. BURLEIN 1,990,222
ANTIGLARE SHIELD FOR REAR VIEW MIRRORS
Original Filed June 5, 1933
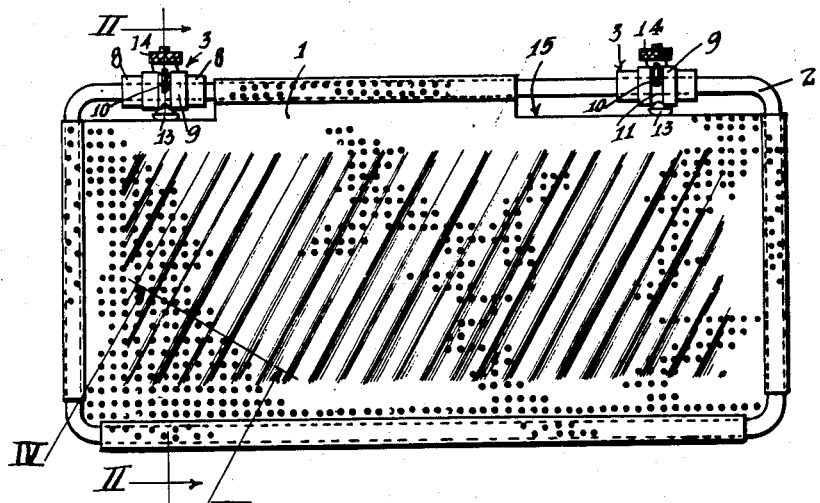
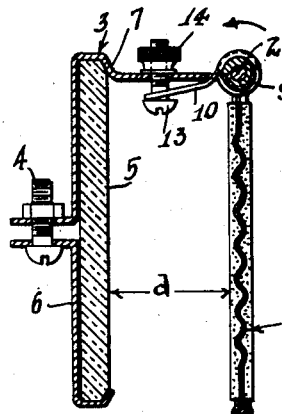
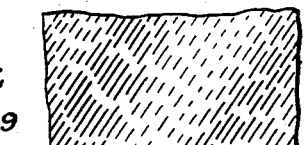
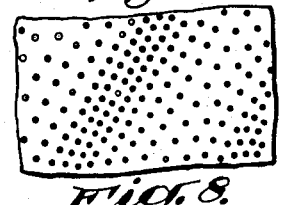
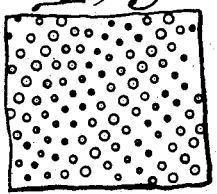
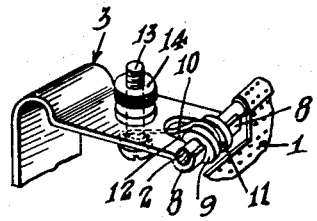
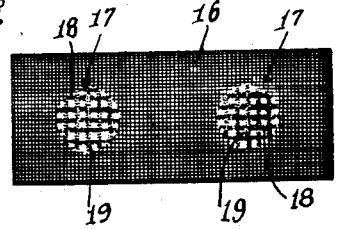
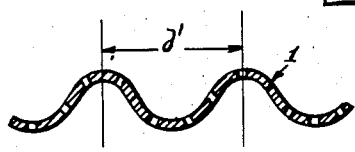
Inventor
Gustave Burlein
By Lyon & Lyon
Attorneys Patented Feb. 5, 1935

1,990,222

UNITED STATES PATENT OFFICE 1,990,222

ANTIGLARE SHIELD FOR REAR VIEW MIRRORS

Gustave Burlein, Huntington Park, Calif.

Continuation of application Serial No. 674,306, June 5, 1933. This application October 21, 1933, Serial No. 694,607

8 Claims. (Cl. 88—1)

This invention relates to anti-glare shields and more particularly to shields adapted to be positioned over the rear view mirrors of motor vehicles for night driving to reduce the intensity of light reflected into the driver's eyes from following vehicles while still permitting the driver to observe the approach of vehicles from the rear.

An object of the invention is to provide a practicable and inexpensive shield constructed of durable materials for the purpose set forth.

Another object is to provide a shield for the purpose set forth, which shield produces a novel and interesting visual effect.

Other more specific objects and features of the invention will be apparent from the detailed description having reference to the drawing.

This is a continuation of my application Serial No. 674,306, entitled "No-glare shields for rear vision mirrors".

In the drawing:

Fig. 1 is an elevation view of my shield;

Fig. 2 is a vertical section in the plane II—II of Fig. 1, showing the shield positioned in front of a rear view mirror;

Fig. 3 is a detail perspective view illustrating the construction of the shield - supporting brackets and hinges;

Fig. 4 is a detail cross section showing the construction of the shield, the section being taken in the plane IV—IV of Fig. 1; and Fig. 5 is a schematic diagram illustrating the visual effect observed by the driver of a vehicle equipped with my shield when observing the head lamps of a following vehicle.

Fig. 6 is a detail view showing a small portion of the area of a modified form of screen, comprising a sheet of semi-transparent material, the transparency of which varies in different parts of the sheet.

Fig. 7 is a detail view of a small portion of still another modified form of screen, comprising a perforated sheet in which the spacing between the perforations is varied in different parts of the sheet to give varying degrees of transparency.

Fig. 8 is a detail view of a small portion of still another modified form of screen, comprising a perforated sheet in which varying transparency in different parts of the screen is obtained by varying the sizes of the apertures.

My shield comprises a perforate metal sheet 1, which is preferably of rectangular shape and dimensioned substantially the same as a rear view mirror with which it is to be used, supported at its outer edges on a wire frame 2. The sheet 1 is preferably secured to the wire 2 by rolling the edges of the sheet around the wire as shown in Fig. 2, although if desired the sheet may be welded or soldered to the wire or secured to the wire in any other desired fashion.

The wire frame 2 is adapted to be supported from a rear view mirror by a pair of bracket members 3 secured to the mirror with which the shield is to be used. Thus, as shown in Fig. 2, each bracket member 3 may extend down over the rear surface of the mirror 5 and be joined by a bolt 4 to a cooperating bracket member 6 which extends to the bottom of the mirror and is hooked around the lower edge of the mirror. Each bracket member 3 may also be bent downwardly as shown at point 7 to engage the upper edge of the mirror.

From point 7 the brackets 3 are extended forwardly a short distance from the face of the mirror 5 and are split and the ends curved to form a pair of seats 8 for engaging and supporting the wire frame member 2 of the shield. A pair of slotted bushings 9 are mounted upon the wire 2 and fit between the pair of seats 8 associated with each bracket 3. To retain the wire 2 in the seats 8 each bracket 3 is provided with a hooked spring member 10, the outer end of which fits in a peripheral groove 11 in the associated bushing 9 and the other end of which extends down through the slot 12 and is curled around a screw 13 which passes upwardly through an aperture provided therefore in the bracket 3 and is provided with a thumb nut 14 on its upper end. The mid portion of each wire 10 rests against the end of the slot 12 through which it passes and may be tensioned by tightening the associated thumb nut 14 to increase the downward pressure of the outer end of the wire against the associated bushing 9 and force the wire 2 against the seats 8.

With the construction described, the wire 2 is free to rotate within the seats 8 and within the bushings 9, its free movement being restricted by the friction introduced as a result of the pressure exerted by the springs 10. By adjusting the thumb nuts 14, a desired amount of friction may be introduced to retain the shield in an upper position above the mirror 5 while at the same time permitting the easy shifting of the device down into the position of use shown in Fig. 2.

To increase the friction, one of the bushings 9 may be rigidly attached to the wire 2 so that it rotates therewith, under which conditions the bushing slides against the spring 10 when the shield is rotated. The other bushing 9 is preferably mounted loosely upon the wire 2 and the portion of the sheet 1 adjacent thereto cut away, as shown at 15 in Fig. 1, to permit adjustment of that bushing longitudinally along the wire and permit of lateral adjustment of one bracket member 3. This may be necessary if the device is to be used on a relatively short mirror.

Sheet 1 may be made of a number of materials but is preferably made of thin metal perforated with a large number of small holes. The exact number of the holes and their diameter is not critical but I have found it convenient to use about 400 perforations per square inch and make the perforations as small as can be easily done. In actual models constructed, the holes have been approximately .025 of an inch in diameter.

In accordance with my invention the main portion of the sheet 1 is corrugated as shown in Fig. 4, the corrugations being preferably straight and parallel and extending diagonally across the sheet at an angle of about 55 degrees to the horizontal edges of the device. If desired, the corrugated portions of the sheet may be extended clear to the margins but for practical considerations it may be desirable to leave the margins of the sheet flat, as shown in Fig. 1, and corrugate only the central area.

The primary reason for providing the corrugations in the sheet 1 is to increase the interference to light passing through the shield. Thus I have found that a corrugated shield produces a much greater average darkening effect than a plain shield having the same number of perforations therein.

A further advantage is that the corrugated shield when positioned in spaced relation to the rear view mirror, as shown in Fig. 2, produces a peculiar and interesting visual effect. Thus the lights of a following car when observed in a rear view mirror equipped with my shield presents the curious appearance illustrated in Fig. 5, in which the main area of the shield appears black, as shown at 16, and the lamps of the following car appear as light circles 17 crisscrossed with dark uniformly spaced horizontal bands 18 and vertical bands 19, thereby giving a checker-board effect. The width and spacing of the bands 18 and 19 is determined by the dimensions of the corrugations in the sheet and by the spacing of the sheet from the mirror. I have found it satisfactory to so dimension the corrugations that the distance $d'$ (Fig. 4) from crest to crest of successive corrugations is approximately 1/6th of an inch and to space the shield approximately 1 inch in front of the mirror (the distance $d$ in Fig. 2). Obviously, however, these dimensions may be varied between wide limits, depending upon the width and spacing of the bands 18 and 19 which is desired.

The direction in which the bands 18 and 19 extend is determined by the angle of the corrugations in the sheet. It has been found by experiment that if the corrugations extend at an angle of approximately 55 degrees from the horizontal, then the bands 18 and 19 will be substantially horizontal and vertical, respectively, as shown in Fig. 5. If the direction of the corrugations are changed, the directions of the bands 18 and 19 will be correspondingly shifted.

Although I have not positively determined why the results described are obtained, it would seem that the crisscrossed bands 18 and 19 are produced by virtue of the fact that light is transmitted through the apertures in sheet 1 in varying degree according to the angle of the axis of each particular aperture relative to the plane of the sheet. Thus if light is directed perpendicularly against the sheet, maximum light is transmitted through apertures located on the crests and in the hollows of the corrugations, whereas less light is transmitted through the apertures on the slopes of corrugations intermediate the crests and hollows.

The effect of the crisscross bands 18 and 19 in Fig. 5 might, therefore, be obtained with a flat shield of any semi-transparent material by actually varying the transparency of the material in successive zones extending across the sheet, instead of varying the effective transparency of successive zones by corrugating the sheet.

If a metal sheet is employed, the varying degree of transparency might be obtained, without corrugations, by using different size apertures in different zones, as illustrated in Fig. 8, or different spacings between apertures, as illustrated in Fig. 7. If material such as glass or celluloid is used, the actual transparency may be varied by introducing some opaque filler or coating into or onto alternate zones, as illustrated in Fig. 6, in which the relatively opaque portions are represented by the long broken lines and the relatively transparent zones by the shorter broken lines.

Although my invention has been described with reference to a particular form of construction, it is to be understood that many variations may be made from the structure described without departing from the spirit of the invention and the invention is to be limited only as set forth in the appended claims.

I claim:

1. A rear view mirror in combination with a shield adapted to be positioned before the mirror and comprising a sheet of corrugated material having a plurality of closely spaced minute perforations therein.

2. A rear view mirror in combination with a shield adapted to be positioned in spaced relation before the mirror and comprising a sheet of corrugated material having a plurality of closely spaced minute perforations thereon.

3. A rear view mirror in combination with a shield adapted to be positioned before the mirror and comprising a sheet of corrugated material having a plurality of closely spaced minute perforations therein, the corrugations being straight and parallel to each other.

4. A rear view mirror in combination with a shield adapted to be positioned before the mirror and comprising a sheet of corrugated material having a plurality of closely spaced minute perforations therein, the corrugations being straight and parallel to each other and lying at an angle of approximately 55° from the horizontal.

5. As an article of manufacture, a shield adapted to be positioned before a rear view mirror, said shield comprising a sheet of corrugated material having a plurality of closely spaced minute perforations therein.

6. As an article of manufacture, a shield adapted to be positioned before a rear view mirror, said shield comprising a sheet of corrugated material having a plurality of closely spaced minute perforations therein, the corrugations all being straight and parallel to each other.

7. A rear view mirror in combination with a shield adapted to be positioned before the mirror and comprising a semi-transparent sheet, consisting of a plurality of substantially identical straight stripe areas, the portion of the sheet within each stripe area varying gradually in transparency from the center to the edges thereof.

8. A rear view mirror in combination with a shield adapted to be positioned before the mirror and comprising a semi-transparent sheet subdivided into a plurality of substantially identical straight stripe areas, the portion of the sheet within each stripe area varying gradually in transparency from the center to the edges of each stripe area.

GUSTAVE BURLEIN.